(No Model.) 2 Sheets—Sheet 1.
T. A. WATSON.
TELEPHONE SWITCH.
No. 270,522. Patented Jan. 9, 1883.
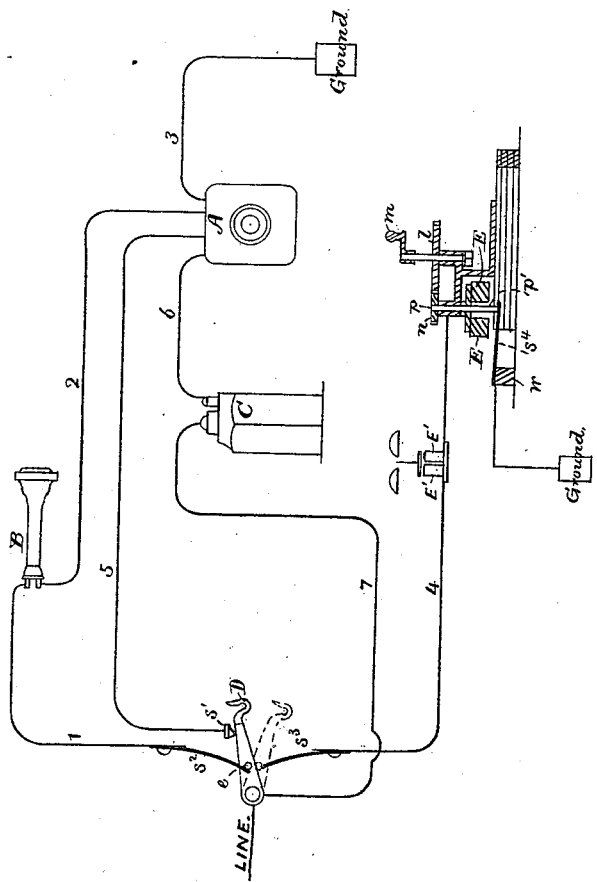
Fig. 1.
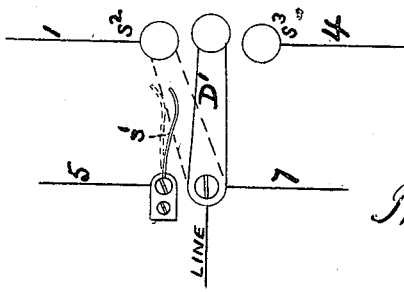
Fig. 1ª
Witnesses:
W. W. Swan
H. G. Olmsted
Inventor:
Thomas A. Watson

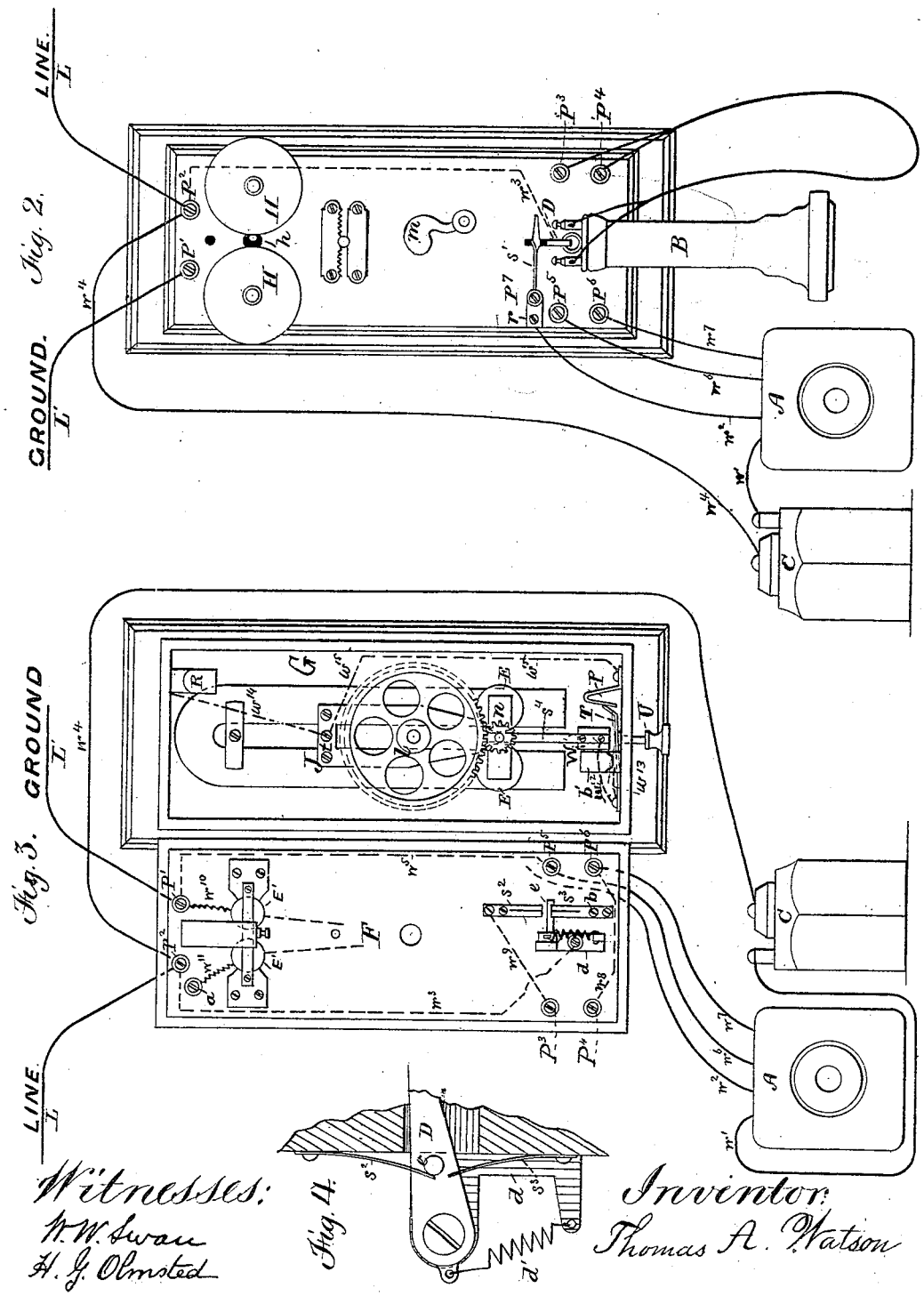

UNITED STATES PATENT OFFICE.

THOMAS A. WATSON, OF EVERETT, ASSIGNOR TO THE AMERICAN BELL TELEPHONE COMPANY, OF BOSTON, MASSACHUSETTS.

TELEPHONE-SWITCH.

SPECIFICATION forming part of Letters Patent No. 270,522, dated January 9, 1883.

Application filed May 5, 1880. (No model.)

*To all whom it may concern:*

Be it known that I, THOMAS A. WATSON, of Everett, in the State of Massachusetts, have invented an Improvement in Telephone-Switches, of which the following is a specification.

The invention consists in the use of a single lever, in connection with a telephone, and a call-circuit and proper contact-points, in such manner that a movement of the lever in one direction disconnects the call-circuit from the main line, brings in the hand-telephone and secondary circuit of the transmitter, and at the same time completes the primary local circuit of the transmitter, while a movement of the lever in the other direction cuts out the hand-telephone and secondary circuit of the transmitter and restores the call-circuit.

The invention consists, further, in making the lever operating as a switch, as aforesaid, in the form of a hook supporting the hand-telephone and combining therewith a spring in such manner that taking the hand-telephone from the hook causes the lever automatically to disconnect the call-circuit, bring in the hand-telephone and secondary circuit of the transmitter and complete the local primary circuit, while hanging the hand-telephone upon the hook causes the lever to automatically cut out the hand-telephone and secondary circuit of the transmitter and restore the call-circuit. The latter form is the one which I have adopted in the practical use of the invention.

In the drawings I have shown my improved switch as directly attached to the box containing the call mechanism, and I have illustrated its operation by diagrams.

Figures 1 and $1^a$ are diagrams. Fig. 2 represents my improved switch in the form of a hook projecting through the cover of the box containing the call mechanism and having the hand-telephone hung upon the hook. Fig. 3 is a view of the box when open, disclosing the mechanism therein. Fig. 4 is an enlarged view of the telephone-hook and adjacent parts. Figs. 2 and 3 show also a local battery, a transmitter, and connecting-lines.

A is the transmitter; B, a hand-telephone; C, a local-battery; E E, the generating-coils of a magneto-machine; and D is the telephone-hook, pivoted to a bracket, $d$, upon the inner face of the cover of the box, and carrying a rod, $e$. The cover is marked F, the box proper G. A coiled spring, $d'$, attached to the hook D and the bracket $d$, throws the hook, when relieved of the weight of the hand-telephone, against a contact-spring, $s'$, upon the outer face of the cover, and the rod $e$ against a contact-spring, $s^2$, upon the inner face of the cover. When the hand-telephone is upon the hook the contact between the hook and the spring $s'$ is broken and the rod $e$ is in contact with spring $s^3$ upon the inner face of the cover, instead of spring $s^2$.

H H are the bells; $h$, the striker, and P' P² P³ P⁴ P⁵ P⁶ are binding-posts inserted in the cover.

P' is a binding-post attached to a plate, $r$, and to it is secured the contact-spring $s'$.

$a$ is a contact-stud in the inner face of the cover.

$b$ is a contact-stud on contact-spring $s^3$.

$b^3$, P, T, and R are contact-springs, and U is a push-button to break contact between springs T and P.

J is the frame of a magneto-machine. $l$ is a gear-wheel of the magneto-machine, operated by a crank, $m$, and taking into a pinion, $n$, on a shaft, $p$, which carries the electro-magnet E E.

$p'$ is an insulated stud upon shaft $p$, and $s^4$ is a contact-spring mounted upon a wooden block, W, and is in contact with stud $p'$.

L is a line-wire entering at binding-post P², and L' is a ground-wire, or, at an intermediate station, a line-wire entering at binding-post P'. The other wires belonging to the mechanism and apparatus thus far described are lettered, as will appear in the description of the circuits, which are as follows:

1. *Local circuit.*—When the hook D is up, the hand-telephone having been removed therefrom, the local primary circuit is from one pole of the battery C, by wire $w'$, through the primary coil of transmitter A, wire $w^2$ to binding-post P⁷, spring $s'$, hook D, bracket $d$, wire $w^3$ to binding-post P², by wire $w^4$, to the other pole of the battery.

2. *Telephone-circuit.*—When the hook is up, the hand-telephone having been removed therefrom, the main circuit is from ground or other station by line-wire L' to binding-post P', by wire $w^5$ to binding-post P⁵, wire $w^6$ to secondary coil of transmitter A, wire $w^7$ to binding-post $P^6$, wire $w^8$ to binding-post $P^4$, through the hand-telephone to binding-post $P^3$, wire $w^9$ to spring $s^2$, rod $e$, hook D, wire $w^3$ to binding-post $P^2$, to line-wire L.

3. *Call-circuit.*—When the hand-telephone hangs upon the hook the above-described circuits are broken and a circuit is established through the magneto-machine as follows: From ground or other station by wire L' to binding-post P', by wire $w^{10}$, bell-coils E' E', wire $w^{11}$ to stud $a$, spring R, wire $w^{14}$ to frame of magneto-generator at $t$, thence by wire $w^{15}$ to spring P; but also, for a shunt-circuit, by said frame to one terminal of generator-coil E, the other terminal being in contact with an insulated stud, $p'$, (see Fig. 1,) the circuit being thence to spring $s^4$, wire $w^{12}$ to spring T, in contact with spring P. The object of this arrangement is to have the coils of the magneto-generator normally short-circuited, so that the currents are not sent to line. The spring T can, however, when desired, be separated from spring P by pressing push-button U, thus breaking the shunt-circuit and allowing the current to flow upon the main line. Spring T is connected by wire $w^{13}$ with spring $b'$, in contact with stud $b$ on spring $s^3$, whence the circuit continues by rod $e$, hook D, bracket $d$, wire $w^3$, and binding-post $P^2$ to line-wire L.

These several circuits are more clearly shown in the diagram at Fig. 1, where many of the details of mechanism are omitted and numerals are used to designate the wires. As shown in diagram 1, the hand-telephone having been removed from the hook, the local circuit is from one pole of the local battery C, by wire 6, through the primary coil of the transmitter A, wire 5, spring $s'$, hook D, and wire 7 to the other pole of the battery, and at the same time the main circuit is established from ground, by wire 3, through the secondary coil of the transmitter-wire 2, hand-telephone B, wire 1, spring $s^2$, rod $e$, hook D, to main line and ground. When the hand-telephone is hung upon the hook the local circuit is broken and the main circuit is established from ground, by wire 8, through magneto-machine E E, the bell-coils E' E', wire 4, spring $s^3$, coil $e$, hook D to main line and ground. In diagram 1$^a$ the hand-lever is shown without the hook, and as operated by the hand, rather than by the weight of the hand-telephone and a counteracting-spring.

I claim—

1. In combination with suitable contact-points and springs electrically connected with the call-circuit and the primary and secondary circuits of a transmitter, the latter circuit including the hand-telephone, a lever electrically connected with the main line in a telephone-circuit, substantially as described, to bring in the hand-telephone and transmitter and break the call-circuit, or to cut out the hand-telephone and transmitter and establish the call-circuit, accordingly as the lever is moved in one direction or the other.

2. In combination with suitable contact-points and springs electrically connected with the call-circuit and the primary and secondary circuits of a transmitter, the latter including a hand-telephone, a lever electrically connected with the main line and provided with a hook to support the hand-telephone, and a spring tending to overcome the weight of the hand-telephone, substantially as described, to bring in the hand-telephone and transmitter and break the call-circuit, or to cut out the hand-telephone and transmitter and establish the call-circuit, accordingly as the hand-telephone is removed from or hung upon said hook.

3. In combination with suitable stops connected with the primary and secondary circuits of a transmitter, the latter including the circuit through the hand-telephone, a lever electrically connected with the main line and adapted to support the hand-telephone, and provided with a spring tending to overcome the weight of the hand-telephone, substantially as described, to complete the local circuit through the transmitter, and at the same time connect with the main line the secondary circuit through the transmitter and hand-telephone by taking the hand-telephone from the hook.

4. In combination with a magneto-generator, a main-line telephone-circuit and a shunt-circuit passing through the magneto-generator, the push-button U to break the shunt-circuit, substantially as described.

5. A switch-lever and contacts for connecting with the line-wire either a telephonic circuit or a call-circuit, according to the position of the switch-lever, in combination with the magneto-generator, its shunt and push-button, the said magneto-generator being connected with the call-circuit, substantially as described.

6. In a telephonic circuit, the spring-hook D, adapted to support the weight of the hand-telephone, in combination with the contact-springs $s'$, $s^2$, and $s^3$, connected with the transmitter hand-telephone and a signaling-circuit, substantially as described, for the purpose specified.

7. In a telephonic circuit, the spring-hook D, adapted to support the weight of the hand-telephone, in combination with contact-springs $s'$ $s^2$ and their connections, substantially as described, to automatically establish the primary local circuit through the transmitter, and at the same time bring into the main line the circuit through the hand-telephone and the secondary circuit through the transmitter by taking the telephone from the hook.

8. A switch-lever connected with the main line of a telephonic circuit and movable in either direction, in combination with the contact-springs $s'$ $s^2$ $s^3$, the transmitter, the hand-telephone, a signaling-circuit, and suitable connecting-wires, substantially as described.

THOMAS A. WATSON.

Witnesses:
W. W. SWAN,
H. G. OLMSTED.